(12) United States Patent
Savkar et al.

(10) Patent No.: US 6,178,821 B1
(45) Date of Patent: Jan. 30, 2001

(54) VIBRATION SENSING DEVICE

(75) Inventors: Sudhir Dattatraya Savkar, Niskayuna; Walter Whipple, Amsterdam, both of NY (US)

(73) Assignee: General Electric Company, Schenectady, NY (US)

( * ) Notice: Under 35 U.S.C. 154(b), the term of this patent shall be extended for 0 days.

(21) Appl. No.: 09/236,427

(22) Filed: Jan. 25, 1999

(51) Int. Cl.⁷ .............................. G01D 9/00; G01L 1/10
(52) U.S. Cl. .......................................... 73/650; 73/862.59
(58) Field of Search .............................. 73/650, 654, 660, 73/661, 862.59; 324/207.2, 207.26, 207.23

(56) References Cited

U.S. PATENT DOCUMENTS

| | | | |
|---|---|---|---|
| 4,107,601 | * | 8/1978 | Barmeier, Jr. et al. ............... 324/173 |
| 4,314,202 | | 2/1982 | Okubo ................................... 324/207 |
| 4,315,214 | * | 2/1982 | Kataoka ................................ 324/208 |
| 4,338,823 | | 7/1982 | Iwasaki ................................... 73/654 |
| 4,764,767 | * | 8/1988 | Ichikawa et al. ..................... 324/174 |
| 5,200,698 | * | 4/1993 | Thibaud ................................ 324/164 |
| 5,375,282 | | 12/1994 | Dausch et al. ............................ 8/159 |
| 5,375,437 | | 12/1994 | Dausch et al. ........................ 68/12.06 |
| 5,438,882 | * | 8/1995 | Karim-Panahi et al. .............. 73/650 |
| 5,474,813 | * | 12/1995 | Walker et al. .......................... 73/650 |
| 5,511,426 | * | 4/1996 | Clement et al. ........................ 73/660 |
| 5,939,879 | * | 8/1999 | Wingate et al. ................. 324/207.17 |

* cited by examiner

*Primary Examiner*—Helen C. Kwok
(74) *Attorney, Agent, or Firm*—Patrick Patnode; Marvin Snyder

(57) ABSTRACT

A vibration sensing device including a strip bearing a pattern of markings. The strip is caused to slide back and forth in front of a sensor as the result of vibration or displacement of an object to which either the strip or the sensor is attached. By varying the spacing between the markings on strip, the direction and approximate speed of the motion can be sensed by the frequency of the signal generated by movement of the pattern past the sensor and its rate of change. The vibration sensing device can be made to sense out of balance (OOB) or vibratory motion of a piece of equipment such as a washing machine, motor engine or other device during use or transport.

17 Claims, 5 Drawing Sheets

VIBRATION SENSING DEVICE

BACKGROUND OF THE INVENTION

This invention relates generally to vibration sensing and more specifically to a vibration sensing device that detects displacement of an object and provides information about the direction and speed of the displacement.

Most vibration sensing devices are of a strain gauge type or piezoelectric devices. Strain gauge type vibration sensors employ an electrical resistance that varies with the magnitude of a vibration and converts an electrical resistance change to a corresponding analog voltage output to produce a vibration detection signal. Similarly, piezoelectric devices employ quartz crystals that convert induced strain to a corresponding analog voltage output. In both types of vibration sensing devices, the changes in the electrical resistance or piezoelectric response provided by the device, in response to the vibrations, are extremely small and complicated circuitry must be provided for filtering noise.

Other methods of detecting vibrations, such as an out-of-balance (OOB) condition of a washing machine, include electronic OOB switches and fluidic pressure switches that can indicate that an OOB condition exists and, in some cases, deactivate the motor of the washing machine when a switch is triggered. An electronic OOB switch is positioned so that the switch is mechanically tripped when a washing machine tub deviates from its normal rotational position within a cabinet. A drawback of this type of switch is that a single deviation of the tub, unrelated to a true out of balance condition and that is unlikely to cause damage, is often sufficient to trip the switch. When the tub is accelerating to a maximum spin speed, for example, it is common to encounter certain natural mechanical frequencies that can induce brief or momentary deviations of the tub sufficient to trip the switch and interrupt the cycle, thereby lengthening the washing time unnecessarily.

Fluidic pressure switches are fairly complex, employing pneumatic generating units to generate a predetermined fluidic pressure in response to deviations of the washing machine tub during the spin cycle. An actuator, which actuator is fluidly coupled to the generating units, provides an actuating position corresponding to an OOB condition. A switch, which is responsive to the actuator in an actuating position, signals that an OOB condition exists.

Existing vibration sensing devices tend to have complex mechanisms or electrical circuitry. Further, current vibration sensing devices generally provide a signal that indicates only that a vibratory or OOB condition exists. Hence, a simple low cost device that not only detects vibration but provides information about the speed and direction of the vibration and which is adaptable to a variety of situations is desirable.

Accordingly, there is a need in the art for an improved vibration sensing device.

SUMMARY OF THE INVENTION

The invention relates to a vibration sensing device comprising a first element configured to be mechanically coupled to an object subject to vibration, so that it will move with the object. A second element, disposed adjacent to the first element, is positioned to interact with the first element so that the first element and second element provide an indication of vibration of the object through relative displacement from each other.

One element is a sensor designed to read a pattern of markings. The other element is a strip having a pattern of markings which reciprocates in front of the sensor as the result of relative motion caused by vibration or the displacement of a piece of equipment to which either the sensor or strip is attached. By varying the spacing between the markings on the strip, the direction and approximate speed of the motion can be sensed by the frequency of the signal generated by the movement of the strip relative to the sensor and a rate of change of the frequency. Thus, the device can be made to sense the out of balance (OOB) or vibratory motion of a piece of equipment such as a washing machine, automotive suspension, motor or other device during use or transport. A simple, low cost device such as the one described enables the user to sense, with reasonable accuracy, potentially damaging motion of an out of balance piece of machinery.

DETAILED DESCRIPTION OF THE INVENTION

In one embodiment, this invention comprises a vibration sensing device having two elements. A first element is a strip having a pattern of markings along its length. The strip is mounted on a surface adjacent to a second element of the device, a sensor and disposed so that the markings on the strip interact with the sensor.

The sensor is any sensor that is capable of detecting a signal generated by movement of the strip relative to the sensor, for example, a Hall sensor that detects perturbations in a magnetic field or an optical sensor such as that used to read bar codes. The sensor is attached to an object subject to vibration. Additionally, the sensor may be stationary and the strip in motion.

Figure 1:
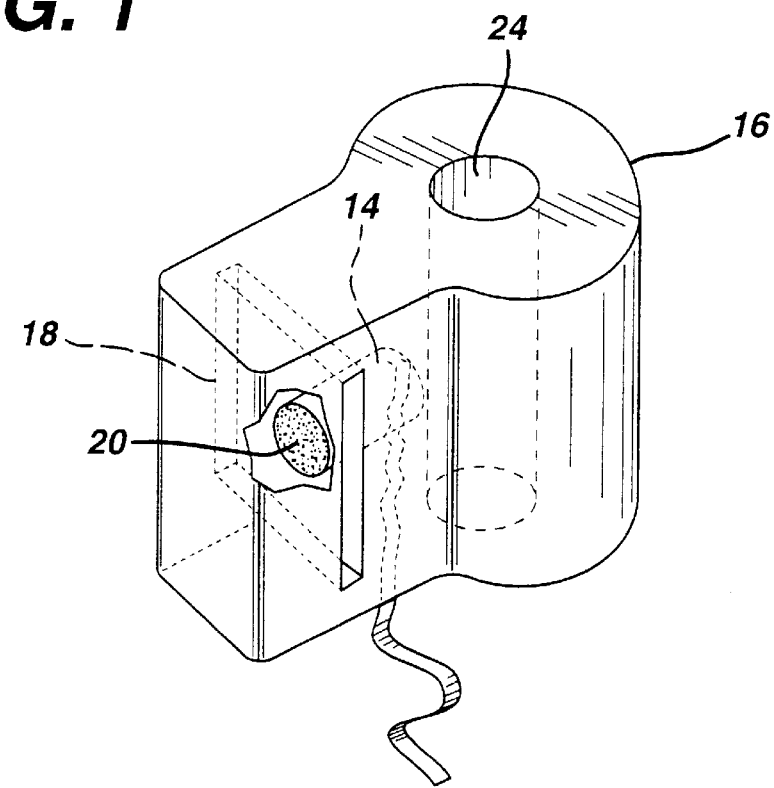
FIG. 1 is a perspective view of one embodiment of a sensor of a vibration sensor device in accordance with the invention.

FIG. 1 depicts one embodiment in which a Hall sensor 14 is used as the sensing element. Hall sensor 14 in this embodiment is embedded in a housing 16. Housing 16 has an opening 24 therethrough for mounting, for example, on a suspension rod of a washing machine. A slot 18 in housing 16 is provided in which strip 10 (FIG. 2) having a motion indicating pattern thereon is inserted so that markings 12 of the pattern are adjacent to sensing face 20 of sensor 14 (See FIG. 3). Those skilled in the art, however, will recognize other possibilities for mounting strip 10 and sensor 14 so that pattern of markings 12 on strip 10 moves past sensing face 20 of sensor 14.

Figure 2:
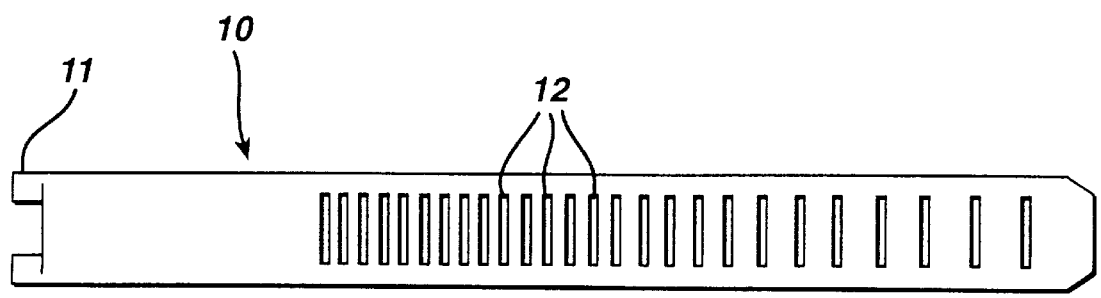
FIG. 2 is a top view of one embodiment of a strip in accordance with the invention with the spacing between markings decreasing in one direction.
Figure 3:
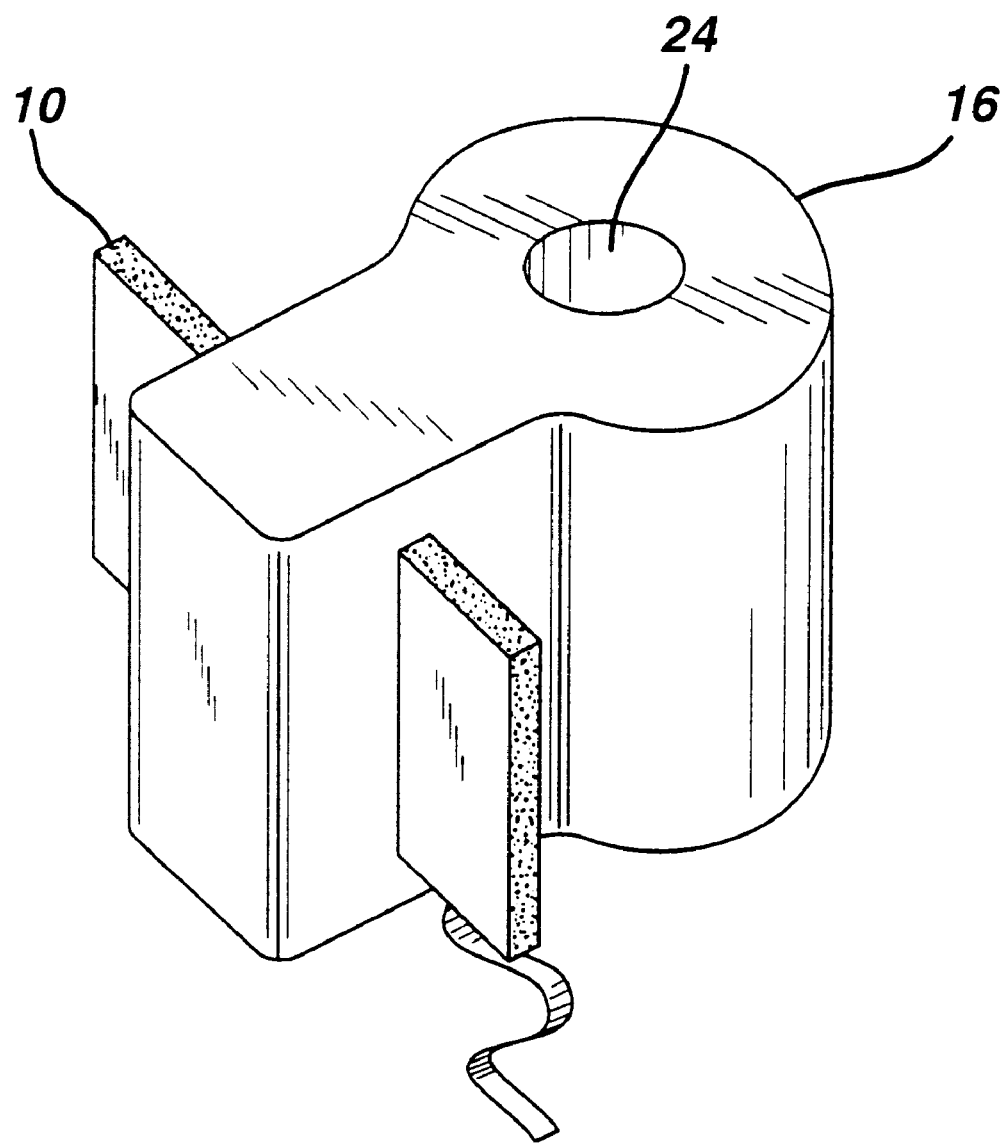
FIG. 3 is a perspective view of a vibration sensing device in accordance with the invention employing the sensor of FIG. 1 and strip of FIG. 2.

Strip 10, in one embodiment, comprises a magnetized steel strip with markings 12 being slots in strip 10, as illustrated in FIG. 2. Alternate embodiments of strip 10 are possible. These include a magnetized rod or wire having grooves or notches that make up the motion-indicating pattern. Further, strip 10 can comprise any suitable non-magnetized material imprinted with magnetic markings in place of slots in a magnetized strip. For example, a strip made of plastic or other suitable material is possible, in which slots have been replaced by bands of magnetic ink along the length of strip 10 or the plastic itself may contain ferrous particles that are subsequently magnetized. Whichever embodiment, when strip 10 moves relative to Hall sensor 14, Hall sensor 14 detects fluctuations in the magnetic field caused by movement in strip 10 relative to slots 16 in the magnetized strip or in between bands of magnetic ink on the plastic strip.

In another embodiment, strip 10 comprises a simple adhesive tape on which the motion-indicating pattern has been imprinted. In yet another embodiment, strip 10 comprises a pattern of markings 12 that are imprinted as an integral feature of the object whose linear movement is to be monitored, that is, on a surface of the object or on a structure that is near the object.

Other sensors may be used in place of the Hall sensor, for example, optical sensors, that can then be used with strips bearing non-magnetized markings. Additionally, the pattern of markings may be varied in orientation and geometric design. Markings made with magnetized or non-magnetized ink allow for more varied patterns and marking densities than patterns made with slots. Increasing the density can increase the sensitivity of the device and provide more detailed information regarding the nature of the motion.

In one embodiment, sensor 14 is mounted on the object subject to vibration by any mechanical means. One end of strip 10 is mounted to a surface near but not on the object subject to vibration so as not to vibrate with the object and so that strip 10 is disposed adjacent to sensor 14. Any mechanical means may be used to attach strip 10, for example, by employing a hinged end 11, as shown in FIG. 2, at one end to allow freedom of movement in more than one direction. In some instances, for example, when the vibratory motion is circular rather than linear, mounting strip 10 on a hinge or swivel allows strip 10 to move angularly. Sensing face 20 (FIG. 1) of sensor 14 is typically centered with respect to the pattern of markings 12 on strip 10. As the object to which sensor 14 has been affixed begins to move, there will be a relative motion between strip 10 and sensor 14 causing sensor 14 to output a signal, of varying frequency, that can be readily detected.

Various information is obtained regarding the nature of movement of the object being monitored depending on the pattern of markings 12 on strip 10. A pattern that has markings at regularly spaced intervals provides information that vibration, speed and magnitude exist. Information regarding direction of movement can be ascertained by modifying the pattern of markings. For example, a pattern in which spacing between markings increases in one direction along the length of strip 10 will provide information regarding the direction of the motion. Since sensing face 20 of sensor 14 is typically centered with respect to the pattern of markings 12 on strip 10, a different frequency results depending on whether strip 10 moves leftward or rightward relative to sensor 14; that is, frequency decreases as strip 10 moves in one direction and increases as strip 10 moves in the opposite direction. Because the width of the interval between markings is known, the number of markings that pass the sensor per unit time, that is, the frequency, gives the speed at which the object is vibrating. The rate at which the frequency of the signal changes provides an indication of the magnitude of the motion.

As a specific example, a vibration sensing device of the type described can be used to detect an out-of-balance condition in a vertical axis washing machine 26 (See FIG. 4s). In a conventional washing operation, articles to be cleaned are loaded into a tub 34, which tub 34, at some point during a wash cycle, is rotated about a spin axis at a relatively high spin speed to remove excess moisture from the articles.

An out-of-balance (OOB) condition can arise during a spin cycle when, for example, articles of clothing asymmetrically bunch up at various locations in spinning tub 34. Due to this load imbalance in combination with the centrifugal force generated during the spin cycle, tub 34 may oscillate uncontrollably and strike washing machine cabinet 28, as well as impose undue stress force on various components of the washing machine such as the transmission, suspension and other machine components. An OOB condition, therefore, can be characterized in terms of deviations of tub 34 in a direction generally perpendicular to the spin axis during the spin cycle, for example.

Figure 4:
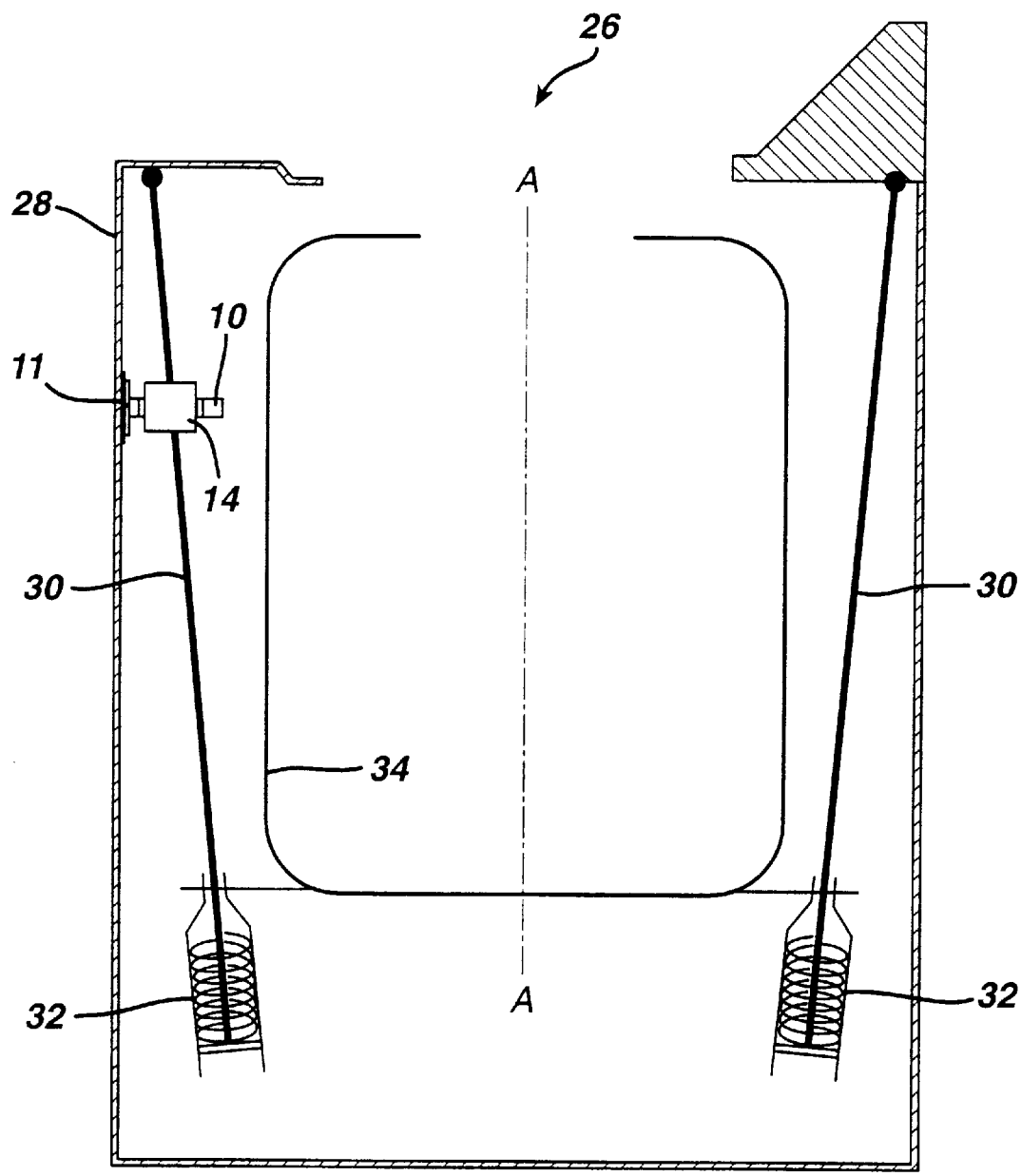
FIG. 4 is a schematic diagram of the vibration sensing device of FIG. 3 mounted on a suspension rod of a vertical axis washing machine.

FIG. 4 shows a simplified schematic view of a washing machine 26 which incorporates one exemplary embodiment of a system for detecting the OOB condition. A suspension, generally used in a washing machine to provide mechanical isolation and support with respect to cabinet 28 and other components such as tub 34, a motor and a transmission, typically comprises connecting rods 30 and springs 32 to which tub 34 is connected. Sensor 14 is affixed to suspension rod 30 of washing machine 26 and strip 10 is mounted on the inside of washing machine cabinet 28 so that markings 12 of strip 10 are adjacent to sensing face 20 of sensor 14. Vibration of tub 34, for example, due to an out-of-balance condition, causes sensor 14 to reciprocate in front of strip 10. Movement of strip 10 with markings 12, with respect to sensor 14, is detected by sensor 14, which can create a signal, audible or otherwise, that alerts a user of the machine's vibratory motion or interrupts the washing operation.

Simple methods of affixing an element of the vibration sensing device to the object to be monitored include mechanical coupling, adhesive attachment, as well as making the strip element an integral part of the object to be monitored. It should be obvious to those skilled in the art, that the details of the mounting (for example, hole 24 (FIG. 1) in Hall sensor housing 16) might be varied or a special mounting arrangement designed for any specific application. For example, when the vibratory motion is not purely linear, as in a washing machine, it is desirable to mount strip 10 of the vibration sensing device in a manner that allows strip 10 to move in directions other than the reciprocating direction.

FIG. 4 illustrates one embodiment in which a flexible strip 10 is mounted on the inside surface of washing machine cabinet by a hinge. This allows strip 10 to move angularly. An OOB condition of washing machine 26 causes tub 34 to vibrate in directions perpendicular to rotational axis A—A. Because strip 10 is flexible and mounted by a hinge, strip 10 retains a spacial relationship relative to sensor 14 but is free to move with sensor 14 if sensor 14 moves in a direction other than reciprocal to strip 10. By mounting strip 10 by means of a swivel, greater freedom of movement is possible.

In another embodiment, the present invention can be used to monitor the movement of large pieces of equipment which are subject to damaging vibratory motion during shipment. By attaching one element of the vibration sensing device to the article to be shipped and the other element of the combination at a location near where the article is anchored to, for example, shipping container with the strip element sufficiently close to interact with the sensor element of the device, any deleterious vibratory motion of the object during transport can be detected.

Figure 5:
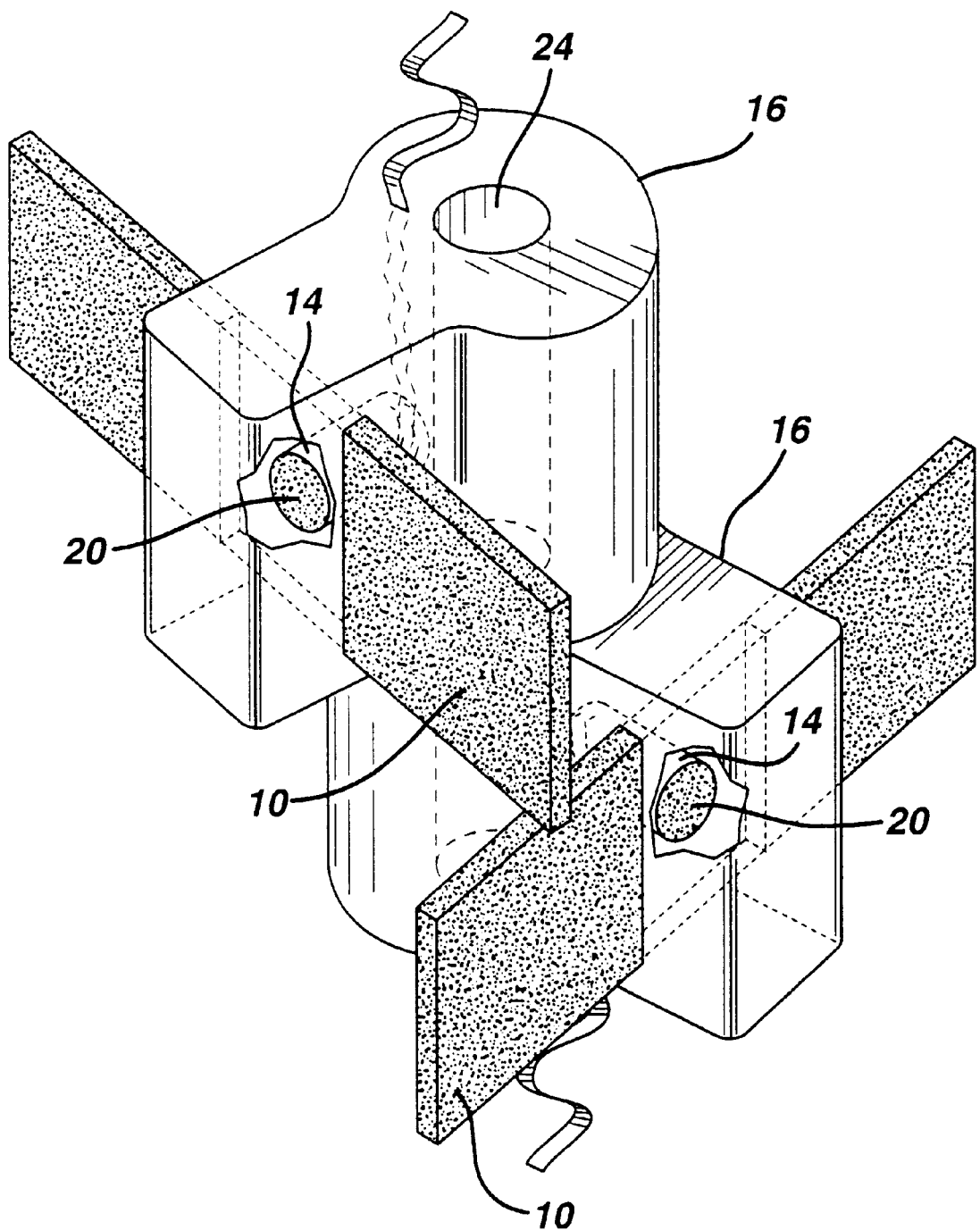
FIG. 5 is a perspective view of two orthogonally oriented vibration sensing devices of the embodiment of FIG. 3 which can be attached to a suspension rod of a vertical axis washing machine.
Figure 6:
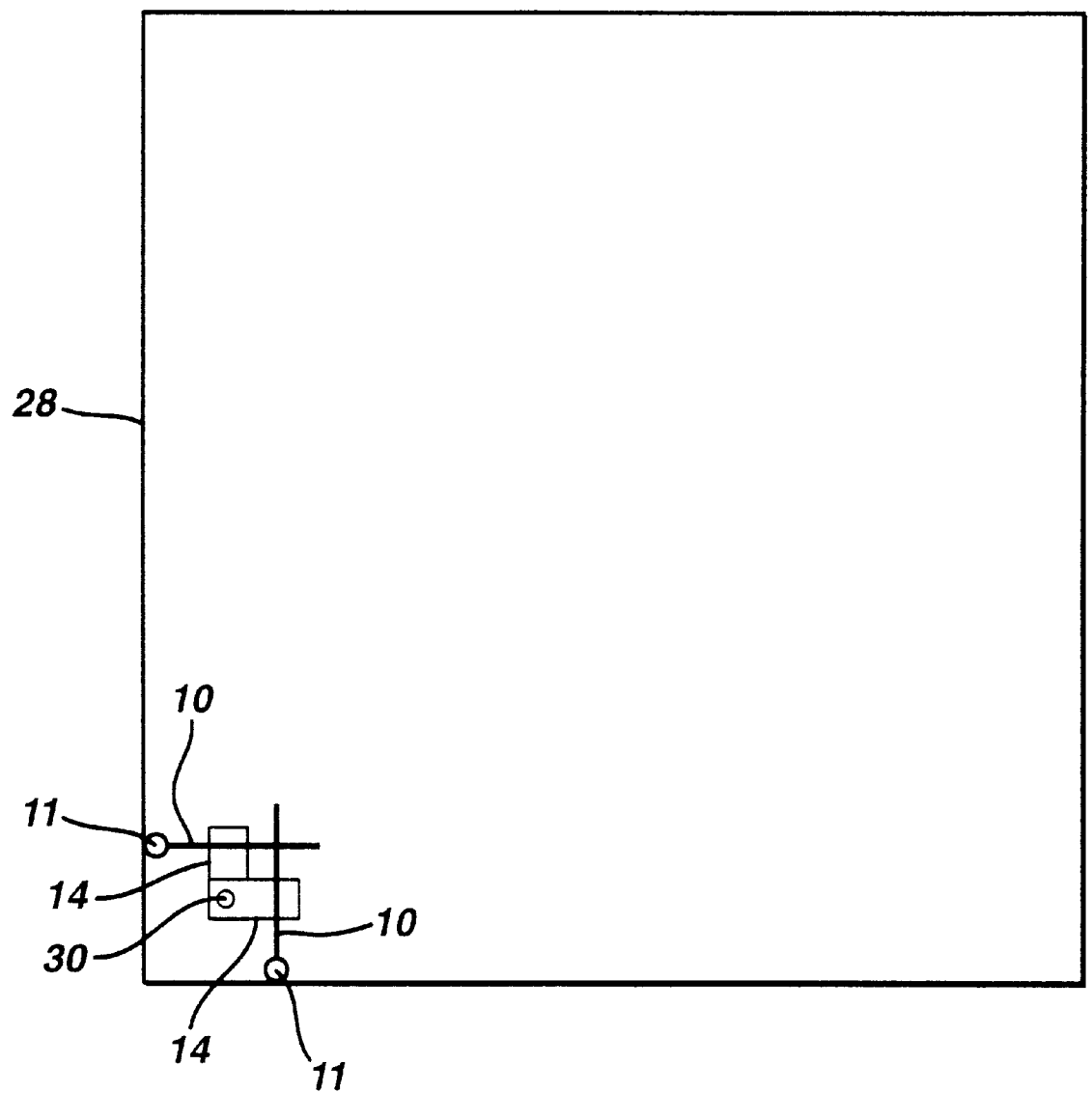
FIG. 6 is a schematic diagram of an orthogonal arrangement of two vibration sensing devices of the invention mounted in one corner of a washing machine cabinet.

Depending on the particular application, an arrangement of one or more vibration sensing devices may be desirable to provide more detailed information about the vibration. This can be accomplished by taking two or more of the devices and mounting them at some suitable location at different angles relative to one another. FIG. 5 demonstrates how two units might be positioned orthogonal to each other to measure vibration in two directions. FIG. 6 is an illustration of two orthogonal units mounted in the corner of a washing machine cabinet. This arrangement provides information regarding two directions of the vibratory motion. By placing additional sensing devices at various angles, information regarding the speed and magnitude of the motion can be determined in several directions. In a system where detailed analysis of a vibration is desired, information regarding the directional components of the vibration obtained from individual sensors in the arrangement can be compiled to provide an overall assessment of the vibration.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A vibration sensing device, said device comprising:
   a first element configured to be mechanically coupled to an object subject to vibration, to move therewith;
   a second element disposed adjacent to said first element, said second element being positioned to interact with said first element so that displacement of said first element with respect to said second element provides an indication of vibration of said object; and
   wherein one of said first element and said second element is a strip having a pattern of markings thereon, and the other of said first element and said second element is a sensor adapted to read said pattern of markings on said strip.

2. The vibration sensing device according to claim 1, wherein said second element is disposed in a substantially fixed position irrespective of vibration of said object.

3. The vibration sensing device according to claim 1, wherein said markings on said strip are at regularly spaced intervals relative to each other.

4. The vibration sensing device according to claim 1, wherein a distance between adjacent markings on said strip increases along said strip.

5. The vibration sensing device according to claim 4, wherein movement of said markings relative to said sensor provides information regarding speed of said displacement.

6. The vibration sensing device according to claim 4, wherein movement of said markings relative to said sensor provides information regarding direction of said displacement.

7. The vibration sensing device according to claim 1, wherein said sensor is a Hall sensor.

8. The vibration sensing device according to claim 7, wherein said strip comprises magnetized steel.

9. The vibration sensing device according to claim 8, wherein said markings comprise slots in said strip.

10. The vibration sensing device according to claim 7, wherein said markings comprise magnetic ink markings.

11. The vibration sensing device according to claim 1, wherein said sensor is an optical sensor.

12. The vibration sensing device according to claim 10, wherein said markings comprise non-magnetic ink markings.

13. The vibration sensing device according to claim 1, wherein an end of said strip is flexibly mounted adjacent to said sensor to allow angular movement of said strip.

14. The vibration sensing device according to claim 13, wherein an end of said strip is mounted adjacent to said sensor with a hinge.

15. The vibration sensing device according to claim 13, wherein an end of said strip is mounted adjacent to said sensor with a swivel.

16. The vibration sensing device according to claim 1, wherein said strip is made of a flexible material to allow angular movement of said strip.

17. A method of sensing vibration of an object subject to vibration comprising:
   attaching at least one first element to an object subject to vibration, to move therewith;
   disposing at least one second element, adjacent to and in position to interact with one corresponding first element, wherein displacement of a respective first element with respect to a respective second element provides an indication of vibration of said object, wherein one of said first element and said second element is a strip having a pattern of markings thereon, and the other of said first element and said second element is a sensor adapted to read said pattern of markings on said strip.

* * * * *